United States Patent
Korupolu et al.

(10) Patent No.: US 8,341,623 B2
(45) Date of Patent: Dec. 25, 2012

(54) INTEGRATED PLACEMENT PLANNING FOR HETEROGENOUS STORAGE AREA NETWORK DATA CENTERS

(75) Inventors: Madhukar R. Korupolu, Sunnyvale, CA (US); Aameek Singh, University Place, WA (US); Bhuvan Bamba, Larchmont, NY (US); Prashant Pandey, San Jose, CA (US); Kaladhar Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 11/752,292

(22) Filed: May 22, 2007

(65) Prior Publication Data

US 2008/0295094 A1  Nov. 27, 2008

(51) Int. Cl.
*G06F 9/455* (2006.01)

(52) U.S. Cl. ............. 718/1; 718/104; 718/105; 709/223

(58) Field of Classification Search .................. 709/223; 718/1, 104, 105
See application file for complete search history.

(56) References Cited

U.S. PATENT DOCUMENTS

| | | | |
|---|---|---|---|
| 6,185,601 B1 * | 2/2001 | Wolff ............................ | 709/203 |
| 6,799,258 B1 | 9/2004 | Linde | |
| 7,003,688 B1 | 2/2006 | Pittelkow et al. | |
| 7,107,274 B2 * | 9/2006 | Sekiguchi et al. .................... | 1/1 |
| 7,478,154 B2 * | 1/2009 | Cochran et al. ................ | 709/224 |
| 2003/0033487 A1 | 2/2003 | Pfister et al. | |
| 2003/0051021 A1 | 3/2003 | Hirschfeld et al. | |
| 2004/0003112 A1 * | 1/2004 | Alles et al. ...................... | 709/237 |
| 2005/0039183 A1 * | 2/2005 | Romero et al. ............... | 718/100 |
| 2005/0228850 A1 * | 10/2005 | Zhu et al. ....................... | 709/200 |
| 2005/0235288 A1 * | 10/2005 | Yamakabe et al. ............ | 718/100 |
| 2006/0288346 A1 * | 12/2006 | Santos et al. ................... | 718/102 |
| 2007/0022426 A1 * | 1/2007 | Steinder et al. ............... | 718/104 |
| 2007/0220586 A1 * | 9/2007 | Salazar et al. .................... | 726/1 |
| 2008/0271039 A1 * | 10/2008 | Rolia et al. ..................... | 718/105 |

FOREIGN PATENT DOCUMENTS

WO  WO 2004/038700 A2  5/2004

* cited by examiner

*Primary Examiner* — Harunur Rashid
(74) *Attorney, Agent, or Firm* — Bradley K. Lortz; Mohammed Kashef (57) ABSTRACT

A storage placement planning system receives a resource graph describing SAN's resources and virtual machine applications requiring a particular amount of a processing resource element and a storage resource element. The system then determines a coupled placement of the processing element and storage element for each of the applications on a coupled pair of the resource nodes based on a specified throughput and a distance factor between coupled pairs of resource nodes. The coupled placement is determined using an algorithm that implements a cost function that determines affinities between processing nodes and storage nodes for each of said applications of a particular workload. The coupled placement for each of said applications identifies the particular amount of processing resource element placed on a first node for providing a processing resource and the particular amount of storage resource element placed on a second node for providing a storage resource for that application.

22 Claims, 6 Drawing Sheets

INTEGRATED PLACEMENT PLANNING FOR HETEROGENOUS STORAGE AREA NETWORK DATA CENTERS

CROSS-REFERENCE TO RELATED APPLICATION

This application is related to the following U.S. patent application, which is incorporated by reference herein:

U.S. patent application Ser. No. 11/752,288, filed on this same day herewith, and entitled "COUPLED PLACEMENT OF ITEMS USING STABLE MARRIAGE TECHNIQUES", by Korupolu et al.

BACKGROUND OF THE INVENTION

1. Field of the Invention

This invention relates to storage area network data centers. Particularly, this invention relates to optimizing placement of applications within a heterogeneous storage area network data center where each application needs a certain amount of CPU resource and a certain amount of storage resource.

2. Description of the Related Art

Server virtualization is becoming an important data center technology. Multiple virtual servers can now be run on a single physical server, using tools like VMware and Xen, and can also be moved seamlessly across physical servers. This consolidates hardware and improves utilization. However, managing such environments remains a challenge.

Furthermore, nodes in the Storage Area Network (SAN) are becoming increasingly heterogeneous. Switches and storage controllers, for example, now have non-traditional availability of processing power. With virtualization technologies, proximity of these nodes from storage resources can yield significant performance benefits by careful placement of applications. This automatic dynamic management of where to run each application is a challenging task that needs to be addressed for realizing utility computing.

Current products in this space, like VMware Infrastructure-3, continuously monitor CPU resource utilization in a data center, and based on certain policies can prioritize how CPU resources are allocated to application virtual machines. However, it only concentrates on optimization of CPU resources for applications, staying oblivious of the underlying storage system. On the other end, tools like Ergastulum, Hippodrome and Minerva, attempt to find suitable storage system configurations taking into account only the storage requirements of applications. There does not exist any framework that attempts to couple an applications' storage and CPU requirements for optimized placement decisions.

Such coupling of applications' storage and CPU placement becomes important as the data centers become large and the variability in the SAN nodes and fabric grows. The hardware and SAN fabric in data center is incrementally built over time, so older less powerful components coexist with newer more powerful ones. Coupled placement of CPU and storage also becomes essential if one were to take advantage of the specialized processing power available at modern fabric switches and storage controllers. Recent hardware trends have introduced this non-traditional availability of processing power. For example, Cisco MDS 9000 switches have multiple blades with Intel x86 processors that can be used to run various applications. On a parallel, IBM DS8000 storage controllers have POWER5 processors that have recently been used to run DB2 database system. Previously, these resources were used only for specialized applications, but now with virtualization technologies these nodes can also be added to the resource pools.

Many applications can drastically improve performance by running on these specialized nodes. For example, a database application that requires lengthy table scans can achieve higher throughput and lower response times by running on the storage controller that hosts its database. The proximity of these processing resources to the storage resources makes them preferable locations for applications that access storage frequently. An independent placement of CPU and storage fails to capture this preference for suitable applications.

Such problems arise in situations where two distinct item types need to be allocated to two resources and the cost of the allocation is determined by the choice of those resources. For example, for placing CPU and storage in a storage area network, depending upon where application storage is placed, all CPU nodes have a certain "affinity" to that storage node and performance of that application will depend on where the CPU is placed. Similar questions arise in deciding where to produce and where to process items in manufacturing. These questions also arise in grid computing and other domains where data and computational resources need to be placed in a coupled manner.

Most current solutions look at only placing one item in a set of resources, e.g., File Allocation Problem, Generalized Assignment Problem and many area specific approximation algorithms, e.g., storage placement, CPU load balancing etc.

This problem captures the basic questions inherent in placing two items in a coupled manner. The NP-Hard nature of the problem can be established by reducing to the 0/1 Knapsack problem. Even if a simpler case of this problem, involving two exclusive resource-A nodes (one is a catch-all node of infinite capacity and large cost) and fixed resource-B allocation, can be solved, it can be used to solve the knapsack problem. This can be solved by making the second resource-A node correspond to the knapsack and setting the costs and $A_{req}$ requirements accordingly. Having to decide coupled placements for both A and B with general cost functions makes the problem more complex.

If either Resource-A or Resource-B allocations are fixed and only the other needs to be determined then there is related work in the computing domain for storage or CPU placement of applications in a data center: File Allocation Problem placing files/storage assuming CPU is fixed; Minerva, Hippodrome assume CPU locations are fixed while planning storage placement; Generalized Assignment problems: Assigning tasks to processors (CPUs). They have been well-studied with several heuristics proposed but they do not consider the coupled allocation.

If the resource requirement (for A and B) for items can always be split across multiple resource nodes, then one could also model it as a multi-commodity flow problem, one commodity per item, introduce a source node for the resource-A requirement of each item and a sink node for resource-B requirement, with the source node connected to all nodes with nonzero A capacity, nonzero resource-B nodes connected to the sink node and appropriate costs on the resource-A and resource-B node pairs. However multi-commodity flow problems are known to be very hard to solve in practice even for medium sized instances. And if the splitting is not justifiable for items (e.g., it requires sequential processing at a single location), then we would need an unsplittable flow version for multi-commodity flows, which becomes even harder in practice.

Another important aspect of the problem is non-uniform costs. If the cost for each item $I_i$ were the same for all $(v_j, v_k)$ pairs then the problem could be simplified to placement for resource-A and B independently without coupling.

U.S. Patent Application Publication No. 2003/0051021 by Hirschfield et al., published on Mar. 13, 2003, discloses a virtualized logical server cloud that enables logical servers to exist independent of physical servers that instantiate the logical servers. Servers are treated as logical resources in order to create a logical server cloud. The logical attributes of a logical server are non-deterministically allocated to physical resources creating a cloud of logical servers over the physical servers. Logical separation is facilitated by the addition of a server cloud manager, which is an automated multi-server management layer. Each logical server has persistent attributes that establish its identity. Each physical server includes or is coupled to physical resources including a network resource, a data storage resource and a processor resource. At least one physical server executes virtualization software that virtualizes physical resources for logical servers. The server cloud manager maintains status and instance information for the logical servers including persistent and non-persistent attributes that link each logical server with a physical server.

U.S. Patent Application Publication No. 2003/0033487 by Pfister et al., published on Feb. 13, 2003, discloses a method, apparatus, and computer implemented instructions for managing a plurality of caches of data, wherein the data processing system includes a plurality of independent computers. In response to initiating a read operation to read data on a data block, an indication is posted on a directory of data blocks identifying the computer that now holds a copy of that block and a location in the memory of that computer where a flag associated with that block is held. Then in response to initiating a write operation on that data block, messages are sent to all the computers holding that block which resets the said flag, thus informing each computer that the data in that block is no longer valid. These messages are sent using means that perform that flag reset without, in the preferred embodiment, any overhead of interruption of processing on the computers where the flags reside.

U.S. Pat. No. 7,003,688 by Pittelkow et al., issued on Feb. 21, 2006, discloses that a fibre channel storage area network (SAN) provides virtualized storage space for a number of servers to a number of virtual disks implemented on various virtual redundant array of inexpensive disks (RAID) devices striped across a plurality of physical disk drives. The SAN includes plural controllers and communication paths to allow for fail-safe and fail-over operation. The plural controllers can be loosely-coupled to provide n-way redundancy and have more than one independent channel for communicating with one another. In the event of a failure involving a controller or controller interface, the virtual disks that are accessed via the affected interfaces are re-mapped to another interface in order to continue to provide high data availability. In particular, a common memory storage device is connected to the back-ends of every controller to provide a storage area. In this manner, the common memory storage device can be accessed via operations similar to those a controller already uses to presently access the physical disks which are connected to the back-end of the controllers.

U.S. Pat. No. 6,799,258 by Linde, issued on Sep. 28, 2004, discloses methods and apparatus for point-in-time volumes are provided. A relationship is enabled between a source volume and point-in-time volume. Copying a data chunk to the point-in-time volume before a write operation modifies the data chunk on the source volume dynamically creates the point-in-time volume. The point-in-time volume can be accessed in read/write mode as a general purpose data storage volume. Other embodiments comprising additional features, such as a forced migration process, are also provided.

Existing systems and methods do not address the problem of planning application placements in virtualized heterogeneous SAN data centers. Thus, there is a need in the art for effectively planning placement of applications in data centers when each application needs a certain amount of CPU resource and a certain amount of storage resource. Particularly, there is a need for programs, methods and systems that place applications having distinct processing and storage requirements considering both in an integrated manner. There is a need for such programs, methods and systems to operate with storage area networks having resource nodes that are connected and each provide different sets of processing and/or storage resources. These and other needs are met by the present invention as detailed hereafter.

SUMMARY OF THE INVENTION

A program, method and system are disclosed for placement planning in a storage area network data center. The program, method, and system disclosed deal with the simultaneous placement of a collection of applications within a resource graph, with each application requiring a certain amount of storage resource and a certain amount of CPU resource from connected resource node pairs within the resource graph.

The resource nodes in the graph can be hosts/servers, storage controllers, switches etc that provide either storage resources, or CPU resources, or both. Some of the modern nodes such as storage controllers provide both. The different node pairs can have different proximities and affinities between each other. Applications requiring high throughput requirements from storage to CPU benefit by being placed on nearby resource node pairs. Various placement algorithms may be used to optimize placement of the applications such as an individual-greedy, pair-greedy or stable marriage algorithm. One placement objective may be to place the programs among nodes of the resource graph without exceeding the storage and CPU capacities at nodes while keeping the total cost over all applications small.

A typical embodiment of the invention comprises a computer program embodied on a computer readable medium, including program instructions for receiving a resource graph describing a storage area network (SAN), the resource graph comprising a plurality of connected resource nodes each providing one or more resources where the resources include processing capability and storage capability for virtual machine applications, program instructions for receiving the applications each having a processing requirement element and a storage requirement element, and program instructions for determining coupled placement of the processing requirement element and the storage requirement element of each of the virtual machine applications on a coupled pair of the plurality of connected resource nodes of the storage area network. This means that each resource node of the resource graph provides processing capability, storage capability or both for virtual machine applications and has varying proximity to other resource nodes of the resource graph. Determining the coupled placement can be accomplished through various algorithms. For example, an individual greedy algorithm, a pair greedy algorithm or a stable marriage algorithm may be used.

In some embodiments, coupled placement operates considering different coupled pairs of the plurality of connected resource nodes of the storage area network have varying degrees of affinity for one another. Coupled placement can operate considering the coupled pair of the plurality of connected resource nodes of the storage area network have a distance factor between one another. Further, coupled placement can operate considering the applications each require a specified throughput between the coupled pair of the plurality of connected resource nodes of the storage area network.

In one embodiment, determining coupled placement operates to minimize a cost factor based on a specified throughput and a distance factor between the coupled pair of the plurality of connected resource nodes of the storage area network for each of the applications. The plurality of connected resource nodes generally can include networked computer devices selected from the group consisting of host computers, switches, fabric nodes and storage subsystems of the SAN.

Similarly, a typical method embodiment of the invention comprising the steps of receiving a resource graph describing a storage area network (SAN), the resource graph comprising a plurality of connected resource nodes each providing at least one resource of processing capability and storage capability for virtual machine applications, receiving the applications each having a processing requirement element and a storage requirement element, and determining coupled placement of the processing requirement element and the storage requirement element of each of the applications on a coupled pair of the plurality of connected resource nodes of the storage area network. Method embodiments of the invention may be modified consistent with the program and system embodiments described herein.

Likewise, a typical system embodiment of the invention comprises a memory for storing a resource graph describing a storage area network (SAN), the resource graph comprising a plurality of connected resource nodes each providing at least one resource of processing capability and storage capability for virtual machine applications and for storing the applications each having a processing requirement element and a storage requirement element and a processor for determining coupled placement of the processing requirement element and the storage requirement element of each of the virtual machine applications on a coupled pair of the plurality of connected resource nodes of the storage area network. System embodiments of the invention may also be further modified consistent with program and method embodiments of the invention described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

An integrated framework is presented that uses a coupled placement algorithm to support CPU and storage placement planning of a collection of applications in a heterogeneous SAN data center environment. Administrators can specify a cost function that determines the affinities between CPU and storage nodes for each application in their data center workload. Based on this cost function, the coupled placement algorithm will output a placement plan which identifies which connected resource nodes where each virtual machine application's CPU and storage requirement elements should be placed as a coupled item.

Figure 1:
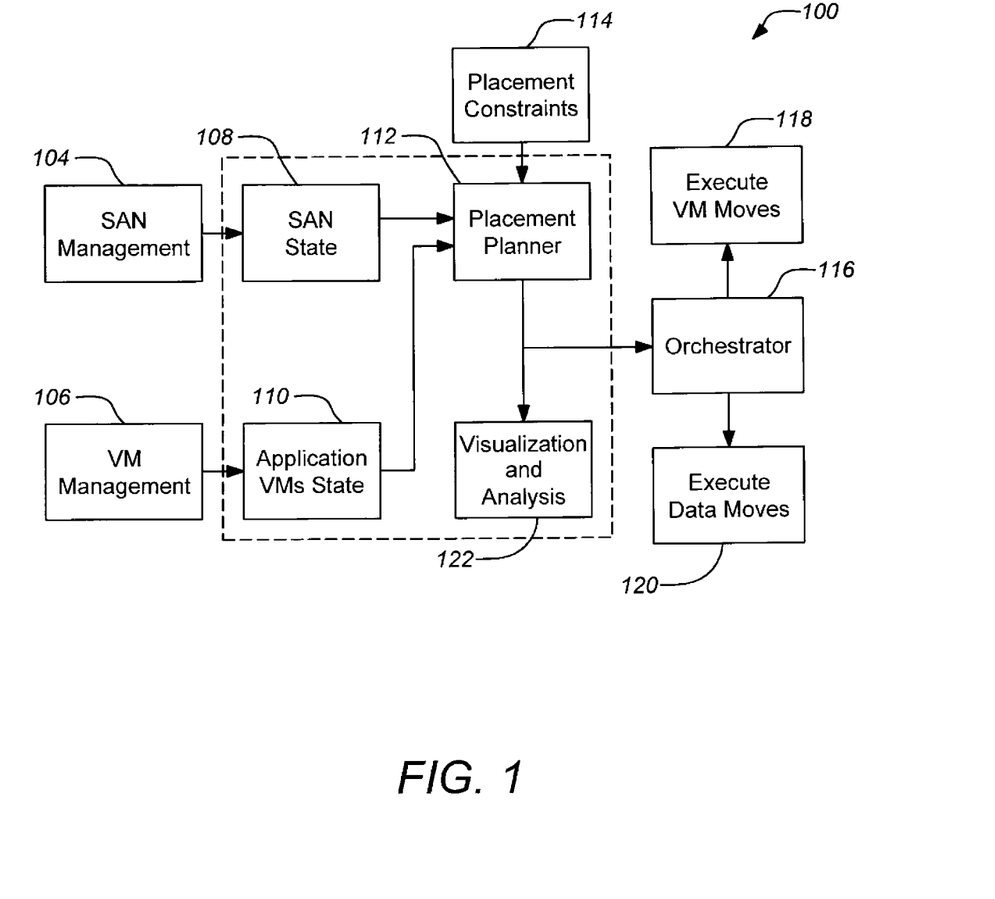
FIG. 1 illustrates an exemplary system for placing collection of applications on processing and storage resource nodes.

FIG. 1 illustrates an exemplary system 100 for placing application items on coupled processing and storage resource nodes. The system 100 can operate as software within the computer hardware environment described in the next section. The coupled placement module receives input from both the SAN management 104 and VM management 106. The SAN management 104 provides information regarding the connected hardware of the SAN including the resources (processing and/or storage) offered by each connected component of the SAN as well as the status of the components. Each connected component of the SAN represents a resource node in the derived resource graph which may be determined by the SAN state module 108. The VM management 106 provides information on the applications that require the resources (processing and storage) to run. For each application it gives the amount of CPU resource required and the amount of storage resource required. This information is processed by the application state module 110.

Both the SAN state module 108 and the VM application state module 110 provide their information to the placement planner 112 which processes them and makes placement determinations of which connected nodes to place the processing and storage requirements of each application on. The placement planner 112 can make these determinations using a variety of coupled placement algorithms which will be described hereafter. The placement planner 112 can also incorporate other placement constraints in the placement determination, such as factors applied in the coupled placement algorithm that tune the affinities between particular resource nodes.

The coupled placement determinations from the placement planner 112 are then provided to an orchestrator 116 which directs the execution of VM application processing moves 118 as well as the data moves 120 to the identified resource nodes to the identified connected resource node pairs. Optionally, the placement determinations can also be provided to a visualization and analysis module 122 which provides for monitoring and studying the performance of different placement algorithms of the placement planner 112 under the applied constraints 114.

2. Hardware Environment

Figure 2A:
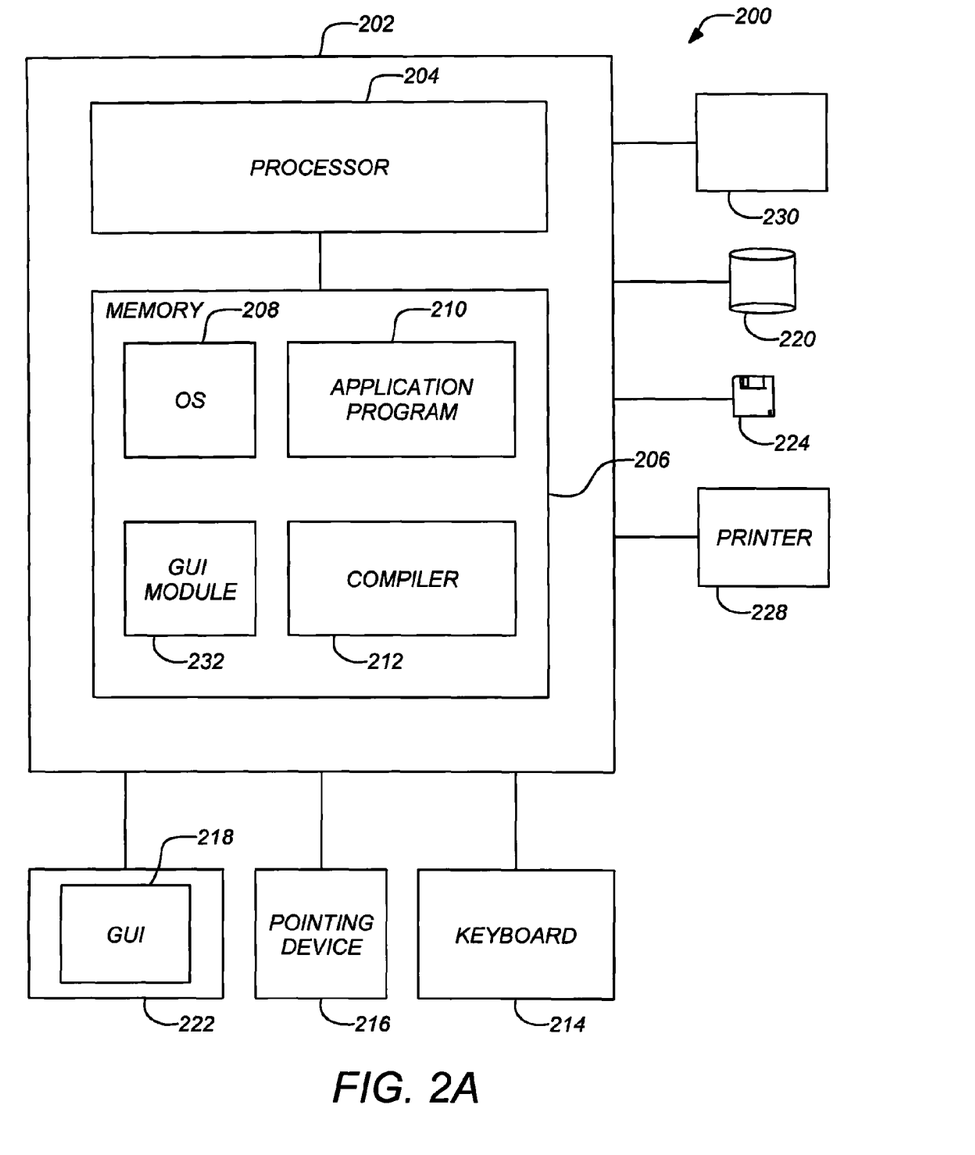
FIG. 2A illustrates a hardware environment that can be used to implement an embodiment of the invention.

FIG. 2A illustrates an exemplary computer system 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer 228, etc. Of course, those skilled in the art will recognize that any combination of the above components, or any number of different components, peripherals, and other devices, may be used with the computer 202.

Generally, the computer 202 operates under control of an operating system 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. Although the GUI module 232 is depicted as a separate module, the instructions performing the GUI functions can be resident or distributed in the operating system 208, a computer program 210, or implemented with special purpose memory and processors.

The computer 202 also implements a compiler 212 which allows one or more application programs 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic generated using the compiler 212. The computer 202 also optionally comprises an external data communication device 230 such as a modem, satellite link, ethernet card, wireless link or other device for communicating with other computers, e.g. via the Internet or other network.

Instructions implementing the operating system 208, the computer program 210, and the compiler 212 may be tangibly embodied in a computer-readable medium, e.g., data storage device 220, which may include one or more fixed or removable data storage devices, such as a zip drive, floppy disc 224, hard drive, DVD/CD-ROM, digital tape, etc., which are generically represented as the floppy disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention are generally directed to a software application program 210 for performing an analysis of resource graphs for a storage area network (SAN) to determine optimized placement of coupled items using stable marriage techniques as described herein, e.g. as described in the system 100 of FIG. 1. The coupled items comprise virtual machine applications that have both a processing requirement element and a storage requirement element. The program 210 for determining placement of the coupled items may operate within a single computer 202 or as part of a distributed computer system comprising a network of computing and storage devices. For example, the system 100 may operate on the computer 258 which oversees the SAN. The applicable SAN may encompass one or more computer devices and/or storage devices connected via a local area network and/or Internet connection (which may be public or secure, e.g. through a VPN connection) as illustrated in the exemplary distributed computer system 250 of FIG. 2B.

Figure 2B:
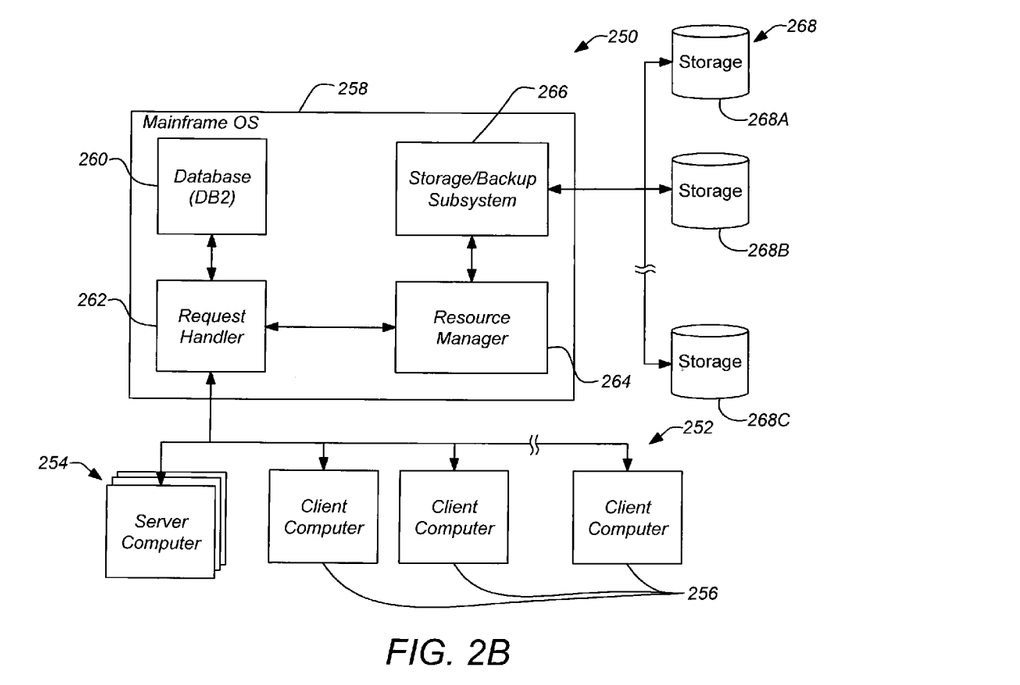
FIG. 2B illustrates a typical distributed computer system which may be employed with a typical embodiment of the invention.

FIG. 2B illustrates a typical distributed computer system 250 which may be employed with a typical embodiment of the invention. Such a system 250 comprises a plurality of computers 202 which are interconnected through respective communication devices 230 in a network 252. The network 252 may be entirely private (such as a local area network within a business facility) or part or all of the network 252 may exist publicly (such as through a virtual private network (VPN) operating on the Internet). Further, one or more of the computers 202 may be specially designed to function as a server or host 254 facilitating a variety of services provided to the remaining client computers 256. In one example, one or more hosts may be a mainframe computer 258 where significant processing for the client computers 256 may be performed. The mainframe computer 258 may comprise a database 260 which is coupled to a request handler 262 which implements a number of database procedures for other networked computers 202 (servers 254 and/or clients 256). The request handler 262 is also coupled to a resource manager 264 which directs data accesses through storage/backup subsystem 266 that facilitates accesses to networked storage devices 268 comprising a SAN. Thus, the storage/backup subsystem 266 on the computer 258 comprises the backup server which manages backup data objects from the client computers 256 stored on networked storage devices 268 in a distributed storage system. The SAN may include devices such as direct access storage devices (DASD) optical storage and/or tape storage indicated as distinct physical storage devices 268A-268C. Various known access methods (e.g., VSAM, BSAM, QSAM) may function as part of the storage/backup subsystem 266.

Figure 2C:
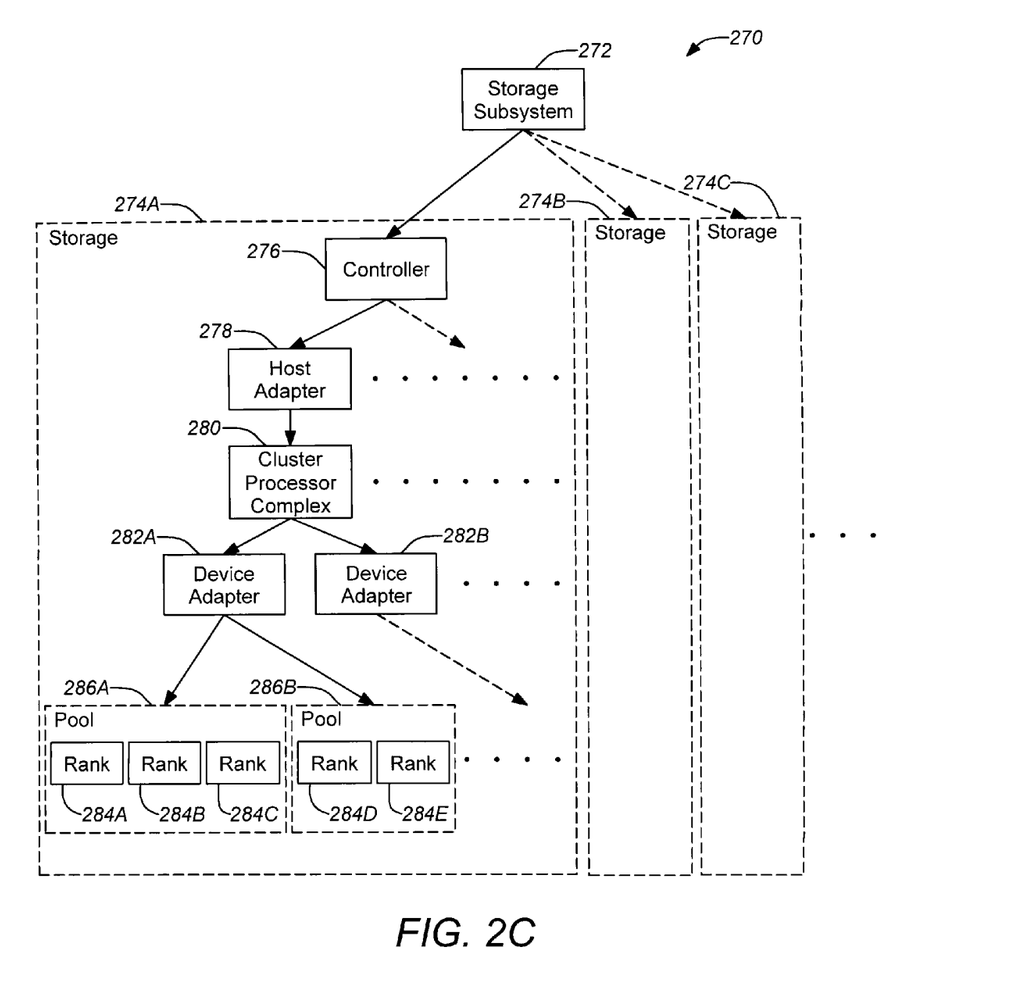
FIG. 2C illustrates a typical storage system implementing an embodiment of the invention.

FIG. 2C illustrates a typical storage system 270 (i.e., a SAN) implementing an embodiment of the invention. For example, the storage system 270 may operate as part of the storage/backup subsystem 266 and storage devices 268 in the distributed computer system 250 of FIG. 2B. A typical implementation of the invention comprises a program 210 operating on the storage subsystem 272 (e.g., the storage/backup subsystem 266 of the computer 258 of FIG. 2B). For example, the storage/backup subsystem 266 operating on the computer 258 may comprise the system 100 described in FIG. 1. The storage subsystem 272 is coupled to a plurality of storage devices 274A-274C. Although only one storage device 247A will be described in detail, it should be understood that other storage devices 274B, 274C may be similarly constituted. The controller 276 directs where data goes within the storage device 274A. The data is at least part of a storage workload coming through the storage subsystem 272. Typically, one or more host adapters 278 operate as the external interface to the system coupled to the cluster processor complex 280, which handles inputs and outputs coming from the one or more host adapters 278. The cluster processor complex 280 is connected to device adapters 282A and 282B, which connect the ranks 284A-E to the system that controls them. The ranks 284A-284E comprise the physical disks where the data is physically stored in the storage device 274A and which are accessed through one or more device adapters 282A, 282B coupled to the cluster processor complex 280. The ranks 284A-284E may be organized into one or more pools 286A, 286B under a given device adapter 282A. The described hardware architecture is only an example; those skilled in the art will understand that any number of different devices (e.g., controllers, host adapters, cluster processors, device adapters and physical disks comprising data volumes) may be coupled together in alternate architectures within the scope of the invention.

Those skilled in the art will recognize many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

3. Coupled Placement in a Storage Area Network

The previous section describes a suitable hardware environment including a storage system or SAN over which an embodiment of the invention can be implemented. To operate, the applicable storage system is properly modeled as a resource graph identifying interconnected nodes each having identified resource capabilities (e.g., CPU processing and/or storage). Such a resource graph can be readily developed for a given hardware architecture by those skilled in the art.

Figure 3:
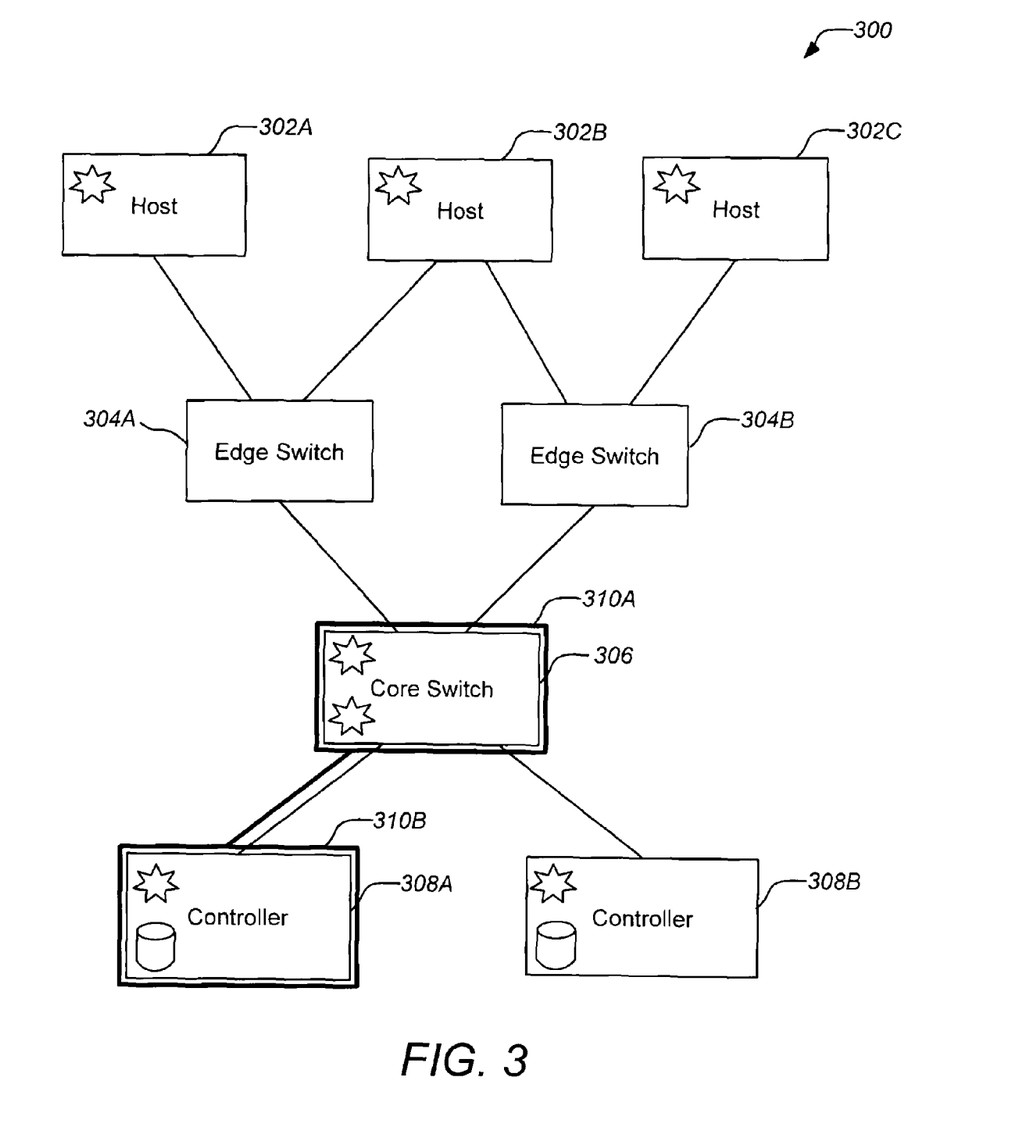
FIG. 3 illustrates a typical resource graph, comprising connected resource nodes and coupled items placed on the connected resource nodes.

FIG. 3 illustrates an exemplary resource graph 300 for a virtualized SAN data center (e.g., similar to the SAN described in FIG. 2C). The graph 300 comprises multiple connected resource nodes of different types providing different types and/or combinations of resources (e.g., CPU processing and/or storage) to applications (coupled items) placed on the coupled resource nodes. There are multiple hosts 302A-302C, which provide processing resources (as indicated by the star icon). The edge switches 304A-304B comprise devices that can channel incoming data from multiple ports to a specific output port that will take the data toward the intended destination. The core switch 306 provides processing resources (indicated by the star icon). In addition, controllers 308A-308B are able to provide both processing and storage resources (as indicated by the star icon and the cylinder icon, respectively). The nodes are connected to one another as shown. Nodes that are connected directly to one another have a distance of one. Nodes that are not directly connected to other nodes may still be considered connected, however a distance factor applies. For example, the host 302A is connected to the controller 308A with a distance of three (the number of hops between the two nodes).

Applied to the terminology of a coupled placement algorithm, the applications each comprise a coupled item including a pair of resource requirement elements, processing and storage. Thus, a application coupled item is shown on the resource graph 300 as the processing requirement element 310A and the storage requirement element 310B placed on the core switch node 306 and connected the controller node 308A. The core switch 306 will provide the processing resource and the controller 308A will provide the storage resource necessary to run the application. It is necessary that the core switch 306 and the controller are connected to facilitate processing of the application as data must move between the storage and the processing. As previously mentioned, optimizing the placement of multiple applications through a coupled placement algorithm is an important feature that will be described in detail in the next section. Weighting of the cost function employed by any of the coupled placement algorithms is another feature that may be employed as described below.

Figure 4:
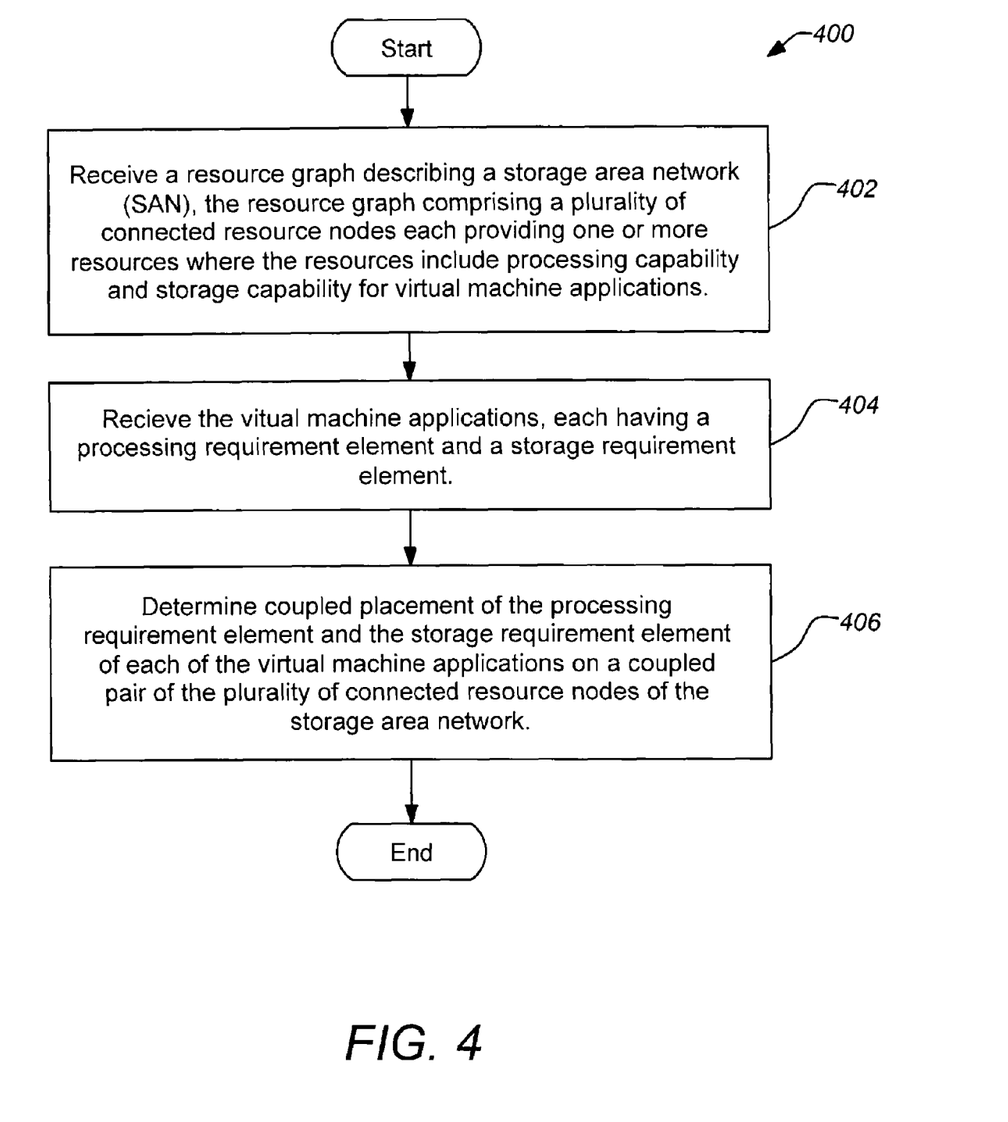
FIG. 4 is a flowchart of exemplary method placing applications on coupled resource nodes of a SAN.

FIG. 4 is a flowchart of exemplary method 400 placing applications on coupled resource nodes of a SAN. The method 400 begins with an operation 402 of receiving a resource graph describing a storage area network (SAN). The resource graph comprises a plurality of connected resource nodes each providing one or more resources where the resources include processing capability and storage capability for virtual machine applications. Next in operation 404, the applications are received, each having a processing requirement element and a storage requirement element. Finally in operation 406, coupled placement of the processing requirement element and the storage requirement element of each of the virtual machine applications on a coupled pair of the plurality of connected resource nodes of the storage area network is determined. The method 400 may be further modified consistent with the program and system embodiments described herein. The coupled placement determination may be performed by many different algorithms. In general, possible placements of the applications are compared based upon cost functions applied to particular application item placements on particular coupled nodes. Any of the applied coupled placement algorithms may also employ customized cost function factors that can be used to modify the algorithm results based on knowledge of the actual hardware of the connected resource nodes as described hereafter.

There may be instances in which it may be advantageous to utilize different cost functions in order to generate a more efficient placement of items, based on different scenarios. In the case of virtual machines, there may be special purpose hardware or driver requirements that require a different cost function to be used in order to properly reflect the optimum placement of the particular resource graph.

Placements may be improved by adjusting the cost function. This improvement may be applied to any existing placement or configuration. If item $A_i$ currently has one of its elements on a node $S_j$ providing storage and the other element on a node $P_k$ providing processing, a factor of ($\psi*A_i$.Stgreq$*C_{S_j \to S_{j'}}$) is multiplied to a traditional cost function Cost($A_i, S_j, P^*$)=Rate($A_i$)*dist($S_{j'}, P^*$) where $A_i$.Stgreq is item A's storage requirement, $C_{S_j \to S_{j'}}$ is the cost of moving $S_j$ to $S_{j'}$, and $\psi$ is a coefficient that may be adjusted, depending on the scenario. This improvement to the cost function is done for the placement of the storage element of the item, and a similar one is performed for the processor element of the item, to improve its placement as well.

There are specific scenarios that encourage the use of high or low v values. A high $\psi$ encourages reorganization only if there is a substantial improvement, as the cost to move an element is increased. A low $\psi$ favors reorganization for any improvement, as the cost associated with moving an element is now lower.

A high $\psi$ value is used for workload surges. A workload surge is identified using virtual machine and storage area network management tools. A reorganization is initiated with the new amplified workload, and the high $\psi$ value is desirable to limit the amount of virtual machine and data migration. The orchestrator automatically executes the chosen reorganizations to stabilize the system.

A high $\psi$ value is also used for node failures. A node failure can be handled as long as applications are stateless or state (e.g., virtual machine state, data) can be recreated. A plan can be output quickly by using only the remaining nodes and setting a high $\psi$ value. The plan is automatically executed and the nearby nodes are quickly restarted.

A low $\psi$ value is used for planned downtimes. This must be done sufficiently in advance for scheduled maintenance, including upgrade downtimes of hardware. Reorganization is preformed setting the resource capacities of those nodes that are going to be upgraded during the downtime, to zero. A low $\psi$ value is used, and a new plan is executed using only those nodes not being upgraded. A low $\psi$ value is used to ensure that a more optimized solution is achieved, rather than limiting migration. The orchestrator executes the plan, and the system is adequately prepared for downtimes.

A low $\psi$ value is also used for planned growth. This can be done sufficiently in advance, in anticipation of estimated growth of workloads or server hardware additions. A reorganization is planned with the new workload or the new hardware nodes. The $\psi$ value is set low since sufficient time is available to execute migrations.

The following sections describe some example algorithms for placement of the applications on coupled resource nodes of the SAN. The coupled item placement algorithms determine coupled placement of applications (each having requirements of a CPU processing element and storage element) on connected resource nodes providing CPU processing and/or storage. Some example algorithms include an individual greedy, a pair greedy and a stable marriage algorithm which are described hereafter. Those skilled in the art will appreciate that many different coupled placement algorithms may be developed and implemented within the scope of the invention. Details of the example placement algorithms are also further described in U.S. patent application Ser. No. 11/752,288, filed May 22, 2007, and entitled "COUPLED PLACEMENT OF ITEMS USING STABLE MARRIAGE TECHNIQUES", by Korupolu et al. (Docket No. ARC920070013US1/IBMCP029), which is incorporated by reference herein.

4. Greedy Individual Placement Algorithm

This section outlines one of two simpler algorithms that can be employed with an embodiment of the invention. The greedy individual placement algorithm INDV-GR places CPU and storage of items independently in a naturally greedy fashion. For ease in exposition, the following example cost function may be used.

$$\text{Cost}(I_i, v_j, v_k) = \text{Rate}(I_i) * \text{dist}(v_j, v_k)$$

The INDV-GR algorithm (Alg-1) first places applications' CPU by sorting items by Rate/CPU_req and greedily assigning them to nodes sorted by LeastCost, which is the cost from the closest storage node. Intuitively, INDV-GR tries to automatically place highest rate items (normalized by their CPU requirements) on CPU nodes that have the closest storage nodes. In the next phase, it will similarly place items' storage on storage nodes (that is, nodes that have non-zero storage availability).

However, as a consequence of its greedy nature, a poor placement of items can result. For example, it can place an item with 600 units A requirement, 1200 units rate at a preferred A node with capacity 800 units instead of choosing two items with 500 and 300 units A requirement and 900, 500 units rate (cumulative rate of 1400). Also, INDV-GR does not account for CPU and storage node affinities beyond using a rough LeastCost metric. For example, if $I_i$ CPU is placed on $v_j$, INDV-GR does not especially try to place $I_i$ storage on the node closest to $v_j$.

5. Greedy Pairs Placement Algorithm

The poor placement of items can potentially be improved by a greedy pairs placement algorithm PAIR-GR that considers items in a greedy fashion and places each ones CPU and storage pair simultaneously.

The PAIR-GR algorithm (Alg-2) attempts such a placement. It tries to place items sorted by Rate/$(\text{CPU}_{req} * \text{Storage}_{req})$ on CPU, storage node pairs sorted by the cost between the nodes of the pair. With this, items are placed simultaneously into CPU and storage buckets based on their affinity measured by the cost metric.

Notice that PAIR-GR also suffers from the shortcomings of the greedy placement where an early sub-optimum decision results in poor placement. Ideally, each CPU (and storage) node should be able to select item combinations that best minimize the overall cost value of the system. This hints at usage of Knapsack-like algorithms. In addition, an important missing component of these greedy algorithms is that, while items have a certain preference order of resource nodes that they would like to be placed on (based on the cost function), the resource nodes would have a different preference determined by their capacity and which item combinations fit the best. Matching these two distinct preference orders indicates a connection to the Stable-Marriage problem described hereafter.

Notice that placing an item together on CPU, storage node pair ($\text{CPU}_j, \text{Storage}_k$) (as done by PAIR-GR) would impact resource availability in all overlapping pairs ($\text{CPU}_j, \text{Storage}_l$) and ($\text{CPU}_m, \text{Storage}_k$). This overlap can have cascading consequences. This indicates that perhaps placing CPU and Storage separately, yet coupled through affinities would hold the key to solving this problem. Combining this observation with knapsacks and the stable proposal algorithm leads us to SPARK.

6. Exemplary Stable Marriage Coupled Placement Algorithm

Consider a general scenario where say the storage part of applications has been placed and we have to find appropriate locations for each one's CPU. Each application $A_i$ first constructs an ordered preference list of CPU nodes as follows: Let $\text{Storage}_k$ be the Storage node where $A_i$'s Storage is currently placed. Then all $\text{CPU}_j$, $1 \leq j \leq A$ are ranked in increasing order of $\text{Cost}(A_i, \text{CPU}_j, \text{Storage}_k)$. Once the preference lists are computed, each application begins by proposing to the first CPU node on its list (like in the stable-marriage scenario). On the receiving end, each CPU node looks at all the proposals it received. It computes a profit value for each such proposal that measures the utility of that proposal. How to compute these profit values is discussed later. The node that received the highest cumulative profit value in proposals is selected and a knapsack computation is performed for that node. This computation decides the set of applications to choose so as to maximize the total value without violating the capacity constraints at the CPU node. These chosen items are considered accepted at that node. The other ones are rejected. The rejected ones move down their list and propose to the next candidate. This process repeats until all items are accepted.

A dummy CPU node $\text{CPU}_{dummy}$ (and similarly a dummy Storage node $\text{Storage}_{dummy}$) of unlimited capacity and large costs from other nodes is defined. These would appear at the end of each preference list ensuring that the item would be accepted somewhere in the algorithm. This catch-all node provides a graceful termination mechanism for the algorithm.

Given these CPU placements, the algorithm then determines the Storage placements for items based on the affinities from the chosen CPU locations. The procedure for the CPU part is similar.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A computer program product for storage and processing node placement planning in a virtualized storage area network (SAN) data center environment, the computer program product comprising a non-transitory computer readable storage medium having computer readable program code embodied therewith, said program code being executable by a computer to:

receive a resource graph describing SAN's resources, said graph includes a plurality of resource nodes, each of the resource nodes providing one or more resources for virtual machine applications, said applications and the resource nodes being in communication with the SAN, and the SAN's resources include processing and storage resources;

receive virtual machine applications, each of said applications requiring a particular amount of a processing resource element and a particular amount of a storage resource element;

determine a coupled placement of the processing element and the storage element for each of said applications on a coupled pair of the resource nodes, using an algorithm that implements a cost function that determines affinities between processing nodes and storage nodes for each of said applications of a particular workload, wherein the algorithm minimizes a cost factor of the cost function, wherein said determining the coupled placement is based on a specified throughput and a distance factor between the coupled pairs of resource nodes;

wherein, said coupled placement for each of said applications identifies the particular amount of processing resource element placed on a first node for providing a processing resource and the particular amount of storage resource element placed on a second node for providing a storage resource for that application, the first node and the second node being connected as a coupled pair, and determining said coupled placement is performed with different coupled pairs having varying degrees of affinity; and compare, said coupled placement for each of said applications, based upon the cost function applied to particular application item placements on particular coupled nodes.

2. The computer program product of claim 1, wherein said algorithm is a individual greedy algorithm.

3. The computer program product of claim 1, wherein said algorithm is a pair greedy algorithm.

4. The computer program product of claim 1, wherein said algorithm is a stable marriage algorithm.

5. The computer program product of claim 1, wherein determining said coupled placement is performed with the coupled pair of the plurality of connected resource nodes of the SAN having a distance factor with respect to each other.

6. The computer program product of claim 1, wherein determining said coupled placement is performed with said applications requiring a specified throughput between the coupled pair of the plurality of connected resource nodes of the SAN.

7. The computer program product of claim 1, further comprising modifying results of the comparison based on specified hardware information of the resource nodes.

8. The computer program product of claim 1, wherein the coupled placement is outputted as a data center placement plan of storage and processing resources for each applications in a particular workload.

9. A method of storage and processing node placement planning in a virtualized storage area network (SAN) data center environment, comprising:

receiving a resource graph describing SAN's resources, said graph includes a plurality of resource nodes, each of the resource nodes providing one or more resources for virtual machine applications, said applications and the resource nodes being in communication with the SAN, and the SAN's resources include processing and storage resources;

receiving virtual machine applications, each of said applications requiring a particular amount of a processing resource element and a particular amount of a storage resource element;

determining a coupled placement of the processing element and the storage element for each of said applications on a coupled pair of the resource nodes, using an algorithm that implements a cost function that determines affinities between processing nodes and storage nodes for each of said applications of a particular workload, wherein the algorithm minimizes a cost factor of the cost function, wherein said determining the coupled placement is based on a specified throughput and a distance factor between the coupled pairs of resource nodes;

wherein, said coupled placement for each of said applications identifies the particular amount of processing resource element placed on a first node for providing a processing resource and the particular amount of storage resource element placed on a second node for providing a storage resource for that application, the first node and the second node being connected as a coupled pair, and determining said coupled placement is performed with different coupled pairs having varying degrees of affinity; and comparing, said coupled placement for each of said applications, based upon the cost function applied to particular application item placements on particular coupled nodes.

10. The method of claim 9, wherein said algorithm is selected from the group consisting of: a individual greedy algorithm, a pair greedy algorithm, and a stable marriage algorithm.

11. The method of claim 9, wherein determining said coupled placement is performed with the coupled pair of the plurality of connected resource nodes of the SAN having a distance factor with respect to each other.

12. The method of claim 9, wherein determining said coupled placement is performed with said applications requiring a specified throughput between the coupled pair of the plurality of connected resource nodes of the SAN.

13. The method of claim 9, wherein the resource nodes include networked computer devices selected from the group consisting of: host computers, switches, fabric nodes and storage subsystems of the SAN.

14. The method of claim 9, further comprising modifying results of the comparison based on specified hardware information of the resource nodes.

15. The method of claim 9, wherein the coupled placement is outputted as a data center placement plan of storage and processing resources for each applications in a particular workload.

16. A storage placement planning system for virtualized storage area network (SAN) data center environments, comprising: a processor; a memory; the memory store executable instructions that when executable by the processor to perform:

receiving a resource graph describing SAN's resources, said graph includes a plurality of resource nodes, each of the resource nodes providing one or more resources for virtual machine applications, said applications and the resource nodes being in communication with the SAN, and the SAN's resources include processing and storage resources;

receiving virtual machine applications, each of said applications requiring a particular amount of a processing resource element and a particular amount of a storage resource element;

determining a coupled placement of the processing element and the storage element for each of said applications on a coupled pair of the resource nodes, using an algorithm that implements a cost function that determines affinities between processing nodes and storage nodes for each of said applications of a particular workload, wherein the algorithm minimizes a cost factor of the cost function, wherein said determining the coupled placement is based on a specified throughput and a distance factor between the coupled pairs of resource nodes;

wherein, said coupled placement for each of said applications identifies the particular amount of processing resource element placed on a first node for providing a processing resource and the particular amount of storage resource element placed on a second node for providing a storage resource for that application, the first node and the second node being connected as a coupled pair, and determining said coupled placement is performed with different coupled pairs having varying degrees of affinity; and comparing, said coupled placement for each of said applications, based upon the cost function applied to particular application item placements on particular coupled nodes.

17. The system of claim 16, wherein said algorithm is selected from the group consisting of: a individual greedy algorithm, a pair greedy algorithm, and a stable marriage algorithm.

18. The system of claim 16, wherein said determines the coupled placement is performed with the coupled pair of the plurality of connected resource nodes of the SAN having a distance factor with respect to each other.

19. The system of claim 16, wherein determines said coupled placement is performed with said applications requiring a specified throughput between the coupled pair of the plurality of connected resource nodes of the SAN.

20. The system of claim 16, wherein the resource nodes include networked computer devices selected from the group consisting of: host computers, switches, fabric nodes and storage subsystems of the SAN.

21. The system of claim 16, wherein the processor modifies results of the comparison based on specified hardware information of the resource nodes.

22. The system of claim 16, wherein the coupled placement is outputted as a data center placement plan of storage and processing resources for each applications in a particular workload.

* * * * *